United States Patent [19]
Sondergeld et al.

[11] Patent Number: 4,911,523
[45] Date of Patent: Mar. 27, 1990

[54] PLUG CONNECTION FOR LIGHT CONDUCTORS

[75] Inventors: Manfred Sondergeld; Claus Wissig, both of St. Georgen/Schwarzwald, Fed. Rep. of Germany

[73] Assignee: Gebr. Schmidt Fabrik Fuer Feinmechanik, Fed. Rep. of Germany

[21] Appl. No.: 237,866

[22] Filed: Aug. 29, 1988

[30] Foreign Application Priority Data

Sep. 1, 1987 [DE] Fed. Rep. of Germany ....... 3729075

[51] Int. Cl.⁴ ................................................ G02B 6/38
[52] U.S. Cl. ................................ 350/96.21; 350/96.2; 350/96.18
[58] Field of Search ................. 350/96.2, 96.21, 96.22, 350/96.18

[56] References Cited

U.S. PATENT DOCUMENTS 4,245,887 1/1981 Johnson ............................ 350/96.21
4,632,505 12/1986 Ållsworth ........................ 350/96.21

FOREIGN PATENT DOCUMENTS 59-52210 3/1984 Japan .................................. 350/96.2
2184565 6/1987 United Kingdom ............. 350/96.21

Primary Examiner—John D. Lee
Assistant Examiner—John Ngo
Attorney, Agent, or Firm—Harness, Dickey & Pierce

[57] ABSTRACT

A plug connection for light conductors comprises identical first and second hermaphroditic plug connector bodies, each connector body having a longitudinally-oriented light conductor guide section provided with a discrete light conductor guide means, and a longitudinally-oriented connector section adjoining the light conductor guide section at a radial plane and being provided with discrete snapping means. The snapping means provide for radially directed and opposite movement of the first and second connector bodies when detaching and joining the first and second connector bodies at their radial planes, thereby obviating the need for a cable allowance for conducting said joining and detaching movements.

23 Claims, 6 Drawing Sheets

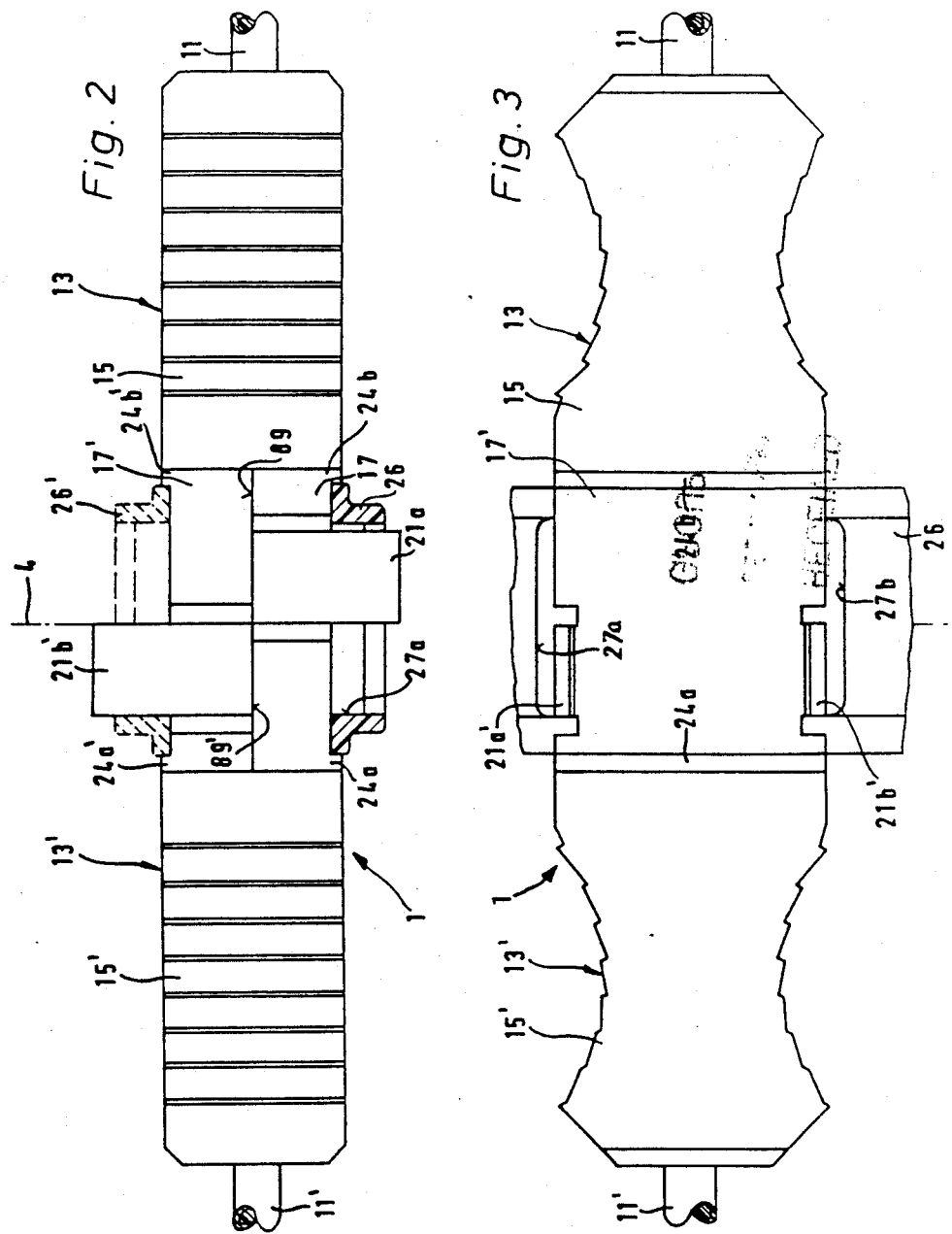

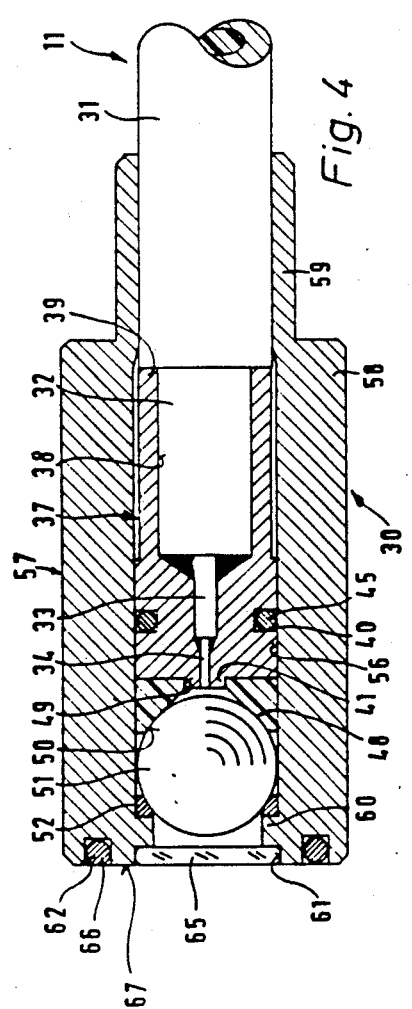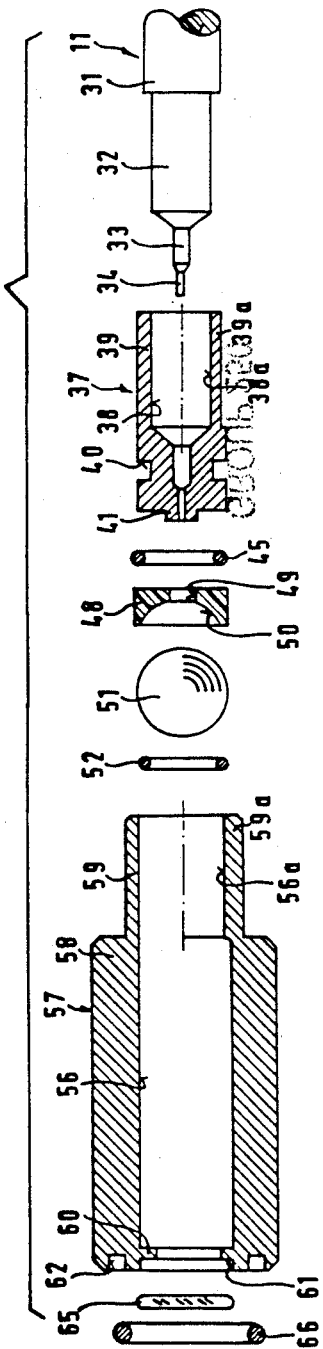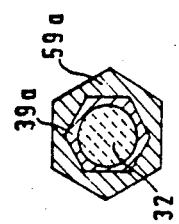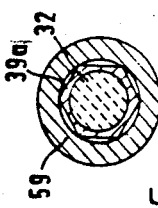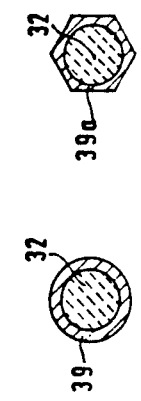

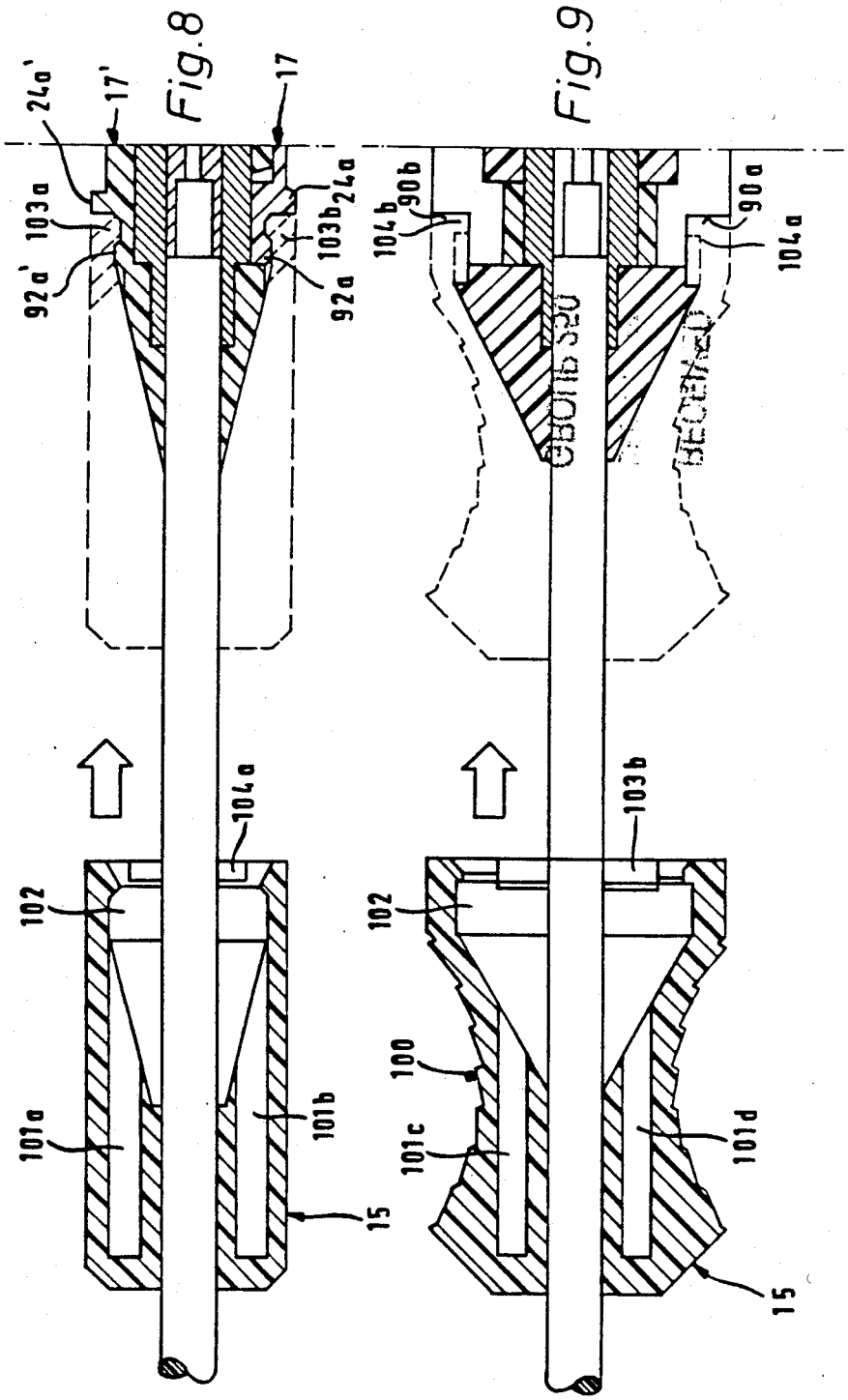

PLUG CONNECTION FOR LIGHT CONDUCTORS

The invention relates to light conductor plug connections having a first plug member and a second plug member, within which member light conductors are run to a transparent face area, said plug members are notchable one to another in such a manner, that said face areas meet at a radial area.

Plug connections of the previous stated kind are well known in the art.

Usually, detachable light conductor connections are plugged in an axial direction. This means, for either joining or detaching the plug connection a certain axial path must be covered to detach or to join a screw type, a bayonet-type or other mechanical-type connection between the two plug members. It is necessary to provide a certain cable allowance for the necessary movement during detaching or joining, if the known plug connections are fixedly mounted in an installation. Due to the fact, that a laying of the cable allowance in form of a cable loop needs particular efforts, the mounting of such light conductor plug connections is complicated considerably. However, this can occur only if any space for disposing such a cable allowance is present.

The known light conductor plug connections are constructed in that either a plug member is coupled to a coupling member having a different design, or two identical plug members are provided, said identical plug members however need a particular coupling element for coupling one to another. Therefore, the known light conductor plug connections need at least two different plug-members. As a result it is necessary to store at least two different plug members for providing such plug connections. Furthermore, the constructive efforts and production costs increase because of two different members must be produced to provide a single plug connection.

Further, the known light conductor plug connections have the disadvantage, of being not protected sufficiently against contamination at the joining area, which results in undesirable attenuations and therefore a loss of signals can occur at the transition of the plug connection. Such plug connections may be cleaned after certain time intervals, said known light conductor plug connections however are constructed in a relatively complicated manner. Therefore, the face areas are accessible difficultly for a cleaning procedure.

Finally, the known light conductor plug connections have the disadvantage of being secured unsufficiently against mechanical shocks. As a result, elements being joined one to another, in particular the adjacent face areas, may be detached. As a result additional attenuation loss can occur, in particular if contamination is deposited within the resulting gaps.

It is therefore object of the present invention, to improve a plug connection of the initially stated art, thereby avoiding the previous stated disadvantages.

This object is achieved by moving the face areas within a radial area to detach and to join the plug members respectively.

The object of the present invention is achieved completely. The mere radially directed movement of the plug members on detaching and on joining the plug connection respectively has the effect, that no cable allowance is necessary for this movement since the plug members are not moved in an axial direction. A plug connection according to invention is in particular useful for firm installation, for example in measuring devices, in vehicles or the like, within which installations the light conductors are fixed by cable-clips to housings or the like, said light conductors may be guided to the plug connection in a parallel and an immediately adjacent disposed manner without the provision of particular alternate spaces for receiving a cable loop serving as allowance on detaching or joining the connection.

According to a preferred embodiment of invention the plug members are designed identically.

This measure has the advantage, that the constructive efforts, the storing and the production costs are decreased considerably since only two identical members are necessary for a single plug connection.

It is preferred particularly, that the plug members being in the joined status have point symmetry to the central point of the face area.

This measure has the advantage that the plug members can be released in optional directions, since, due to the point symmetry it is not of relevance which one of the two plug members has to be hold an which one has to be moved.

According to a further preferred embodiment of invention, the light conductor sections being disposed within the plug members are run by means of a cable sleeve along a direction being substantially perpendicular to the radial area.

This measure has the advantage, that a particular less space taking construction is achieved, since the light conductor sections are run within the plug members along the shortest possible path to the face area.

Relating to that embodiment it is particularly preferred to support the light conductor sections within the cable sleeves by formlocking supporting means of the respective other plug member.

This measure has the advantage that the plug members can be clipped one to another in a particular simple manner without the need of any particular tool.

For example, this can be achieved by the fact that the cable sleeves are supported by the plug member at sections along its lengths, at least exposed around a section of its circumference, and that the supporting means engage the said exposed circumferential sections.

This measure has the advantage that a particular reliable connection is provided, since the engaging formlocking means immediately engage the cable sleeve. Therefore, a symmetrical construction of the plug connection results in that both cable sleeves are directly connected one to another in a formlocking manner.

In that case it is particularly preferred to provide the supporting means as flexible snapping grippers.

This measure has the advantage that a definite pressure point is provided after joining the plug connection, thereby assuring an optimal connection between the two light conductor sections.

It is further preferred an embodiment of invention having cable sleeves comprising cylindrical outlines and having snapping grippers being a pair of jaws opening to one side, said pair of jaws having a spheric receiving and having inlet inclinations at the free terminal ends of the jaws.

This measure result in a particular effective and simple constructional design, since the pair of jaws having the spheric receiving surrounds the cable sleeve in a reliable manner, the inner diameter of said receiving is suitably somewhat smaller than the diameter of the cable sleeve. At the same time the inlet inclinations at the free terminal ends of the jaws assure that the plug connectin can be joined without particular force efforts.

Particular good effects are achieved with a further embodiment according to invention by the fact, that the plug members are provided with a wedge surface, said wedge surface causes a force-locking abutment of the face areas after joining the plug members.

This measure has the advantage that due to directed axial movements of the plug members one to another the face areas abut with face pressure and said face areas are maintained in that position with face pressure too. Though, no gaps are formed between the face areas after hard shocks, vibrations or the like, and therefore, in long time use, attenuations due to contaminations are avoided reliably.

Within this embodiment it is preferred to provide the wedge surfaces at a guide block receiving the cable sleeve axially fixed.

This measure has the advantage that the axial locking of the plug connection is independend which kind of cable sleeve is used. Therefore, the cable sleeve can be adapted to different kinds of light conductors without changing the constructive design of the guide block.

These advantages are further increased by the fact that the cable sleeves protrude axially from the guide-blocks and said cable sleeves are engaged at this point by the snapping gripper of the respective other plug member, thereby a face area of the snapping gripper slides over the wedge surface.

This measure has the advantage, that the snapping grippers are effective in a double manner, first supporting the cable sleeve of the respective other plug member, and second serving as a counter part to the wedge surface for axial locking of the plug members.

Particular good effects are achieved relating to this method by the fact that the cable sleeves protrude the guide blocks at both sides and are engaged on both sides by the snapping grippers of the respective other plug member.

The resulting comb-like construction having engaged the snapping grippers and guide blocks of both plug members like two engaging combs has the advantage, that a particular reliable mechanical locking is achieved in axial and in radial direction too.

According to preferred embodiments of invention the plug members are provided with connecting members having abutment areas aligned perpendicular to the radial area and directed to the center point of the face area.

This measure has the advantage that the previous stated point-symmetrical configuration of the plug members is formed, within said configuration a dividing plane in the outer area of the connecting members is in a plane, for example in a horizontal plane.

It is in particularly preferred to form the connecting members and the snapping grippers in one piece, and preferably the guide blocks too.

This has the advantage that the connecting members may be produced in great series with low costs, for example as a sprayed article of plastic or of metal, and therefore an additional assembly of snapping grippers or guide blocks is no more necessary.

According to another preferred embodiment of invention, the connecting members are provided with notches at its end turned away from the radial area and locking caps are slidable over the joined connecting members, said locking caps engage flexibly with counter notches beyond the notches.

This measure has the advantage, that a further securing of the assembled connecting members is achieved by the fact that the locking caps close the joined members at both ends respectively pairwise and notch the connecting members one to another.

It is thereby preferred to provide the locking caps with cavities in such a manner that due to pressing the cavities by hand the counter notches and notches detach.

This method has the advantage that the locking caps can be easily detached by hand if a releasing of the plug connection is necessary.

Within some embodiments of invention the cable sleeves are provided with a transparent ball within the section of the face area. The light conductor section adjoins the ball with its face at a side being turned off from the face area.

This measure has the advantage that light emitting the preferrably polished face area of the light conductor is distributed to a greater cross section due to the transparent ball, said ball works like a "Shoemaker's ball". Even if due to manufacturing tolerances or due to other influences a small radial displacement relatively one to another of the two plug members occurs, only a disregardable attenuation of signals will result, since the ball having a relatively great diameter produces a light beam with great diameter too, said beam still covers a great area at both plug members, although if a radial displacement of said members is present.

A particular effect is achieved by the fact, that the face area of the light conductor section is disposed at a certain distance from the transparent ball surface. In particular the distance is in that the face area is disposed at the focal point of the ball.

This measure has the advantage, that an optimum optical situation is achieved, since emitting of light out of the light conductor from the face area of the working cross section at the place of the focal point of the ball enables a good "Shoemaker's ball effect", and a maximum uniform distribution of light occurs about the total cross section of the ball.

Suitably, the ball is supported by a ball bed providing said distance.

This measure has the advantage, that the ball is not only supported by a ball bed being adjusted to its geometry, but said ball is additionally adjusted at the previously stated distance in a mechanical manner and is secured permanently at this position.

It is particularly preferred to incase the ball in direction of the face area by means of a transparent protecting window.

This measure has the advantage, that contaminations of the sensitive optical inside elements of the plug connection are avoided definitely.

This advantages are further increased by the fact, that the ball and the facial end of the light conductor section is incased between sealings disposed within a longitudinal bore of the cable sleeve.

It is further preferred to crimp the light conductor section about its circumference within the cable sleeve, in particular a light conductor section with sectional reduced cross sections, said light conductor sections being crimped within the cable sleeve at different cross sections.

These measures have the advantage that a reliable axial supporting of the light conductor section within the cable sleeve is achieved. Therefore, even if considerably tension loads occur at the cable, a detaching of cable and plug member is not to expect.

A particular preferred embodiment of said version is characterized in that a portion of the light conductor section having a smaller cross section is crimped into a fiber end sleeve, thereby producing a polygon cross section of the fiber end sleeve. Following to this, the cable sleeve is slided over the polygon cross section onto a section of the light conductor section having a greater cross section, and finally the light conductor section is crimped within the cable sleeve thereby forming a further polygon being offset about a half polygon centerpoint angle.

These measures have the advantage, that a crimping of the fiber end sleeve forms an outer polygon, preferably an outer hexagon, having longitudinal edges being slidable along the inner surface of the cable sleeve, said inner surface being cylindrical in the first instance. Due to a further crimping with an angle offset of 30° (hexagon-contur) a particular intensive crimping is achieved. The second crimping of the cable sleeve has the additional effect, that the fiber end sleeve within the cable sleeve is pushed in frontal axial direction, as a result, the ball bed having the transparent ball is held by the fiber end sleeve in frontal direction axially fixed within the cable sleeve.

A further advantageous embodiment of invention is characterized by the fact that the face area is provided with an circumferential sealing.

This measure has the advantage, that joining the plug members in radial direction and thereby notching in axial direction, the circulferential sealings lie against one another, resulting in an extremely good sealing effect. Said effect avoids a contamination of the plug connection, in particular within the sensitive section containing the face areas.

Further preferred embodiments of invention are characterized by the fact, that the joined plug members are substantially of freestone-like shape This measure has the advantage that, in particular installed with fixedly mounted plug connections, a less space consuming configuration is possible, since the freestone-like plug connections may be disposed immediately adjacent and one above the other respectively.

Relating to these features it is further preferred to dispose an assembly bar perpendicular to the direction of moving the plug members, said plug members being mountable by supporting means at the assembly bar.

This measure has the advantage, that with a stationary construction, numerous of plug connections can be fixed side by side at the assembly bar.

It is preferred to form the supporting means as hooks being disposed at the plug members, said hooks can be clipped flexibly into recesses at the assembly bar.

This measure has the advantage, that several plug members can be clipped side by side on the assembly bar, wherein said individual plug member of said two joined plug members being not clipped on the assembly bar may be detached in radial direction away from the respective other plug member. However, it is possible to fix each plug connection on both sides at the assembly bar, and if desired, the assembly bar may be once more connected thereto for achieving an extremely security against a detaching of the plug connections.

Relating to said embodiments in view of low cost-intensive production it is also preferred to form the hooks in one piece with the connecting member.

Other advantages of the invention will become apparent from the specification and the attached drawing.

It is understood that the features mentioned before and being described in greater detail hereafter can be used not only in their descibed combinations, but also in any other combination or individually, without leaving the scope of the present invention.

Hereafter, certain embodiments of the invention will be described with reference to the drawing, in which FIG. 1 shows a perspective view of one embodiment according to invention, illustrating a joined plug connection;

FIGS. 2 and 3 show two views being perpendicular one to another of the plug connection of FIG. 1, illustrating further details in particular in connection with an assembly bar;

FIG. 4 shows an extremely enlarged sectional view of an assembled cable sleeve;

FIG. 5 shows an exploded view in reduced scale of the cable sleeve of FIG. 4, further comprising four cross-sectional views (a)-(d), illustrating a crimping procedure;

FIGS. 8 and 9 show two views for illustrating the mounting of locking caps.

Figure 1:
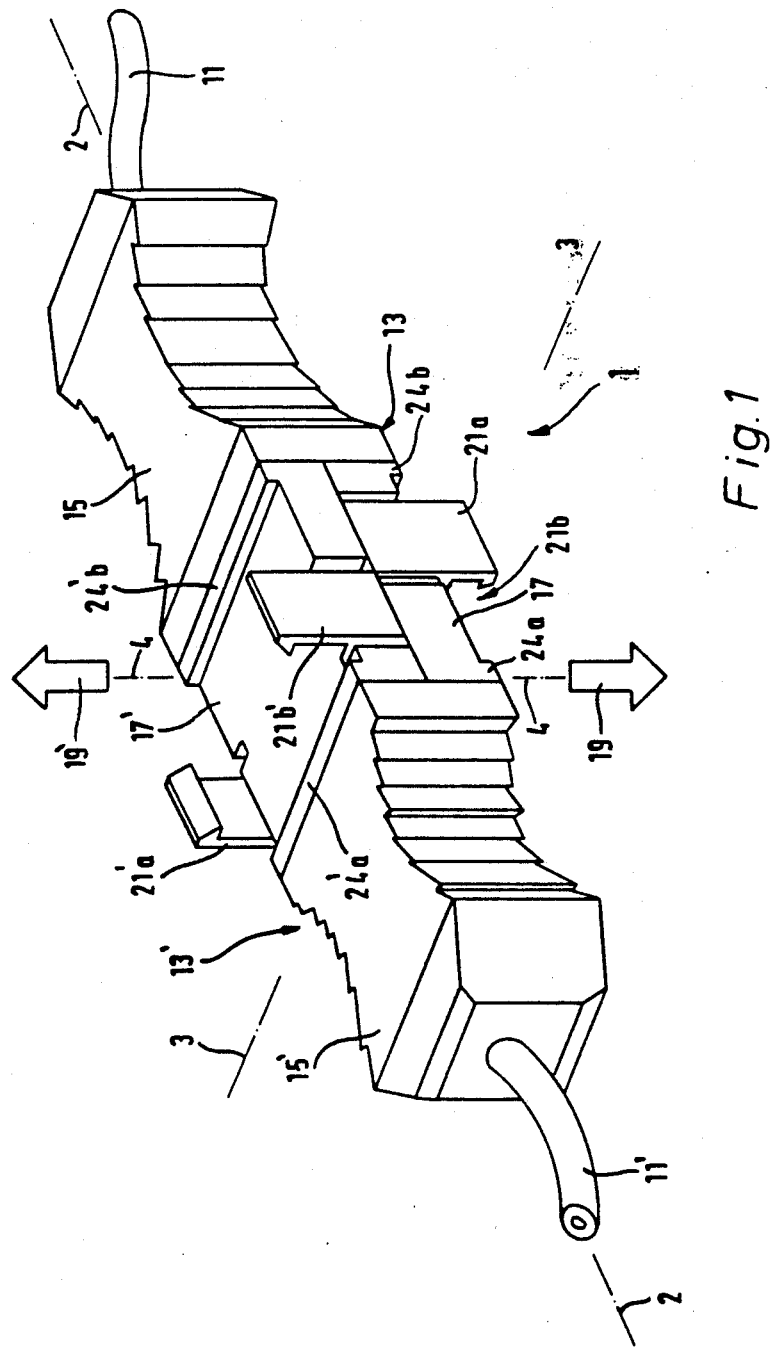

Within FIGS. 1–3 reference number 1 refers to one embodiment of a plug connection according to invention. A first axis 2 serves as main axis, and light conductors to be connected extend within said main axis at the area of the plug connection 1. A second axis 3 and a third axis 4, both axes being perpendicular to said main axis, define a radial plane ¾ at the center of the plug connection 1.

A first light conductor section 11 leads to a first plug member 13, and a second light conductor section 11' leads to a second plug member 13'. The plug members 13, 13', are provided with locking caps 15, 15' at its ends directing away from the radial plane ¾. Between the locking caps 15, 15' two superposed connecting members 17, 17' are visible. These elements are later described in more detail.

For detaching the plug connection 1 from the closed or joined position, as illustrated in FIG. 1, it is at first necessary to pull away the locking caps 15, 15' 422 later in connection with FIG. 8 and 9. Thereupon, the first plug member 13 and the connecting member 17 too are moved downwards in direction of arrow 19 and/or the second plug member 13', locking cap 15' and connecting member 17' are moved upwards in direction of arrow 19', both movements are directed away from each other along the axis 4. The closing movement occurs in opposite direction and in opposite order.

As can be seen in FIGS. 1 to 3, the connecting members 17 and 17' are provided with first snapping hooks 21a and (not visible in FIG. 1) 21b, and 21a' and 21b' respectively. Edge strips 24a, 24b disposed on connecting members 17 and edge strips 24a' and 24b' disposed on connecting member 17' extend radial and spaced apart from the radial plane ¾ and extend parallel to the second axis 3. The afore mentioned elements serve for fixing the plug connection 1 to an assembly bar 26, shown in FIGS. 2 and 3. The assembly bar 26 extends in direction of the second axis 3 and is symmetrical to the radial plane ¾. The assembly bar 26 is guided laterally by the edge strips 24a and 24b, and snapping hooks 21a and 21b engage recesses 27a, 27b for clipping the connecting member 17 thereon.

In a likewise manner a further assembly bar 26' may be guided and clipped above the second connecting member 17' accordingly.

Due to a substantially freestone-like shape of the plug connection 1, at least in the area of the connecting members 17 and 17', as can be seen in FIG. 1, several plug connections can be disposed on the assembly bar 26, side by side in a less space consuming manner. Due to the fact, that the movement during detaching and joining occurs in direction of arrows 19, 19' no allowance need to be provided at the light conductor sections 11 and 11' to join or to detach the plug connection 1, since the plug members 13 and 13' may be moved along a circular path. The center point of that path is disposed at a next mounting point of the light conductor section 11, 11'.

The light conductor sections 11 and 11' are supported in a lens system couplings 30 within the plug members 13 and 13', said lens system couplings 30 are generally referred as 30 in FIG. 4 and 5.

The light conductor section 11 is reduced stepwise along its length within the area of the lens system coupling 30, starting from an originally first cross section 31 to a second cross section 32, a third cross section 33 and a fourth cross section 34. The fourth cross section 34 corresponds to the active area of the light conductor section 11 and is preferably provided with a polished face area.

The light conductor section 11 is inserted into a fiber end sleeve 37 with its end of manifold reduced cross areas. The fiber end sleeve 37 is therefore provided with a suitably contoured stepped longitudinal bore 38. As can be seen in FIG. 5, a right end of the fiber end sleeve 37, is formed as a first crimp neck 39. The fiber end sleeve 37 is provided at its outer periphery with an annular groove 40. The fiber end sleeve 37 ends in a prolongation 41 with reduced cross section at the left frontside, as shown in FIG. 5.

A first O-ring 45 is disposable within the annular groove 40.

The prolongation 41 of the fiber end sleeve 37 engages a corresponding bore 49 within a ball bed 48, provided at that side being faced apart from the fiber end sleeve 37 with a spheric receiving 50 for receiving a glass ball 51. The ball bed 48 is designed in such a manner, that a definite distance is adjusted between the surface of the glass ball 51 and the face area of the fourth cross section 34. Preferably the face area is disposed within the focal point of the glass ball 51. The glass ball 51 has a diameter being considerably greater than the diameter of the fourth active cross section 34 of the light conductor section 11. According to a typical embodiment of invention the diameter of the glass ball 51 may be 3 mm, therefore 30-fold the diameter of the fourth cross section 34. A second O-ring 52 is disposed in front of glass ball 51 at the side being faced apart from ball bed 48.

For assembling the lens system coupling 30, the first light conductor section 11 is inserted with its end being manifold reduced in cross section into the fiber end sleeve 37 and is there crimped at the area of the first crimp neck 39. The first O-ring 45 is inserted into the annular groove 40, and the ball bed 48 is pushed on the prolongation 41 of the fiber end sleeve 37 at its frontside. The glass ball 51 is disposed within the spheric receiving 50 of the ball bed 48 and the so formed arrangement is inserted into a longitudinal bore 56 of a cable sleeve 57 from the right side in axial direction, as can be seen in FIG. 5. The arrangement has slided on to the frontside a second O-ring 52.

The cable sleeve 57 comprises a thickwall front section 58 and a second crimp neck 59. The first light conductor section 11 is crimped at its first cross section 31 having original size within the crimp neck 59.

The illustrations (a) to (d) of FIG. 5 demonstrate the crimping procedure step by step. At first the end portion of light conductor section 11 having the first reduced cross section 32 is inserted with its cylindrical outer shape into the hollow cylindrical crimp neck 39, shown in the upper part of FIG. 5 above the symmetric line.

The hollow cylindrical crimp neck 39 is now formed with a suitable crimping tool, i.e. with a crimping clamp or the like, to build a hexagon outer shape, as shown in illustration (b) within FIG. 5 and as indicated in the upper part of FIG. 5 below the symmetric line. Further, as it is shown, the longitudinal bore 38 is somewhat reduced after crimping.

The outer contour of the crimp neck 39a is of such size, that the edges of the polygon at first abut against the cylindrical inner surface of the hollow cylindrical second crimp neck 59, as shown in illustration (c). That procedure results in a reliable axial guiding having a constant optical axis, i.e. the center point of the light conductor section is constantly.

Using a further crimping tool, the second crimp neck 59 is formed to a polygon cross section, for example into an outer hexagon contour. Both polygons of crimp neck 39a and crimp neck 59a are thereby offset about a half centerpoint angle, if using an outer hexagon, therefore offset about 30°. As a result one edge of one contour faces the center of a longitudinal side of the respective other contour. Therefore a particular reliable formlocking is achieved. A further essential effect of that measure is that a minimum axial movement of the fiber end sleeve 37 occurs, due to crimping the second crimp neck 59. As can be seen in FIG. 4, the second crimp neck 59 is somewhat offset axially with respect to the first crimp neck 39. Therefore a crimping of the second crimp neck 59 pushes the fiber end sleeve 34 to the left side, shown in FIG. 4, since the material passes away during crimping. Therefore, the fiber end sleeve 37, the ball bed 48 and the glass ball 51 are pushed against the second O-ring 52 to the left side according to the illustration in FIG. 4, as a result the disposement of the lens system coupling 30 is exactly and is protected against shocks and/or vibrations.

The light conductor section 11 and the fiber end sleeve 37 are inserted axially into the longitudinal bore 56 in such a firmly manner, that the glass ball 51 firmly abuts at its frontside against the second O-ring 52, thereby pushing said O-ring 52 against an inner annular shoulder 60 within the longitudinal bore 56 of the cable sleeve 57, as shown in FIG. 4.

The annular shoulder 60 defines at its left front side, according to illustration in FIG. 5, a facial recess 61 of cylindrical shape, surrounded by an annular groove 62. A transparent protecting window 65 is adhered or welded into the facial recess 61, and a third O-ring 66 is disposed within the annular groove 62.

In that way a frontial face area 67 of the lens system coupling 30 is formed, said face area 67 being disposed exactly within readial plane ¾ of the plug connection 1. Due to adhering or welding the transparent protecting window 65, a seal capsulating of the optical elements at the inner side of the lens system coupling 30 results, said sealed capsulation is additionally maintained due to the O-rings 45, 52 and 66 and further due to the crimping of the crimp necks 39 and 59.

Figure 6:
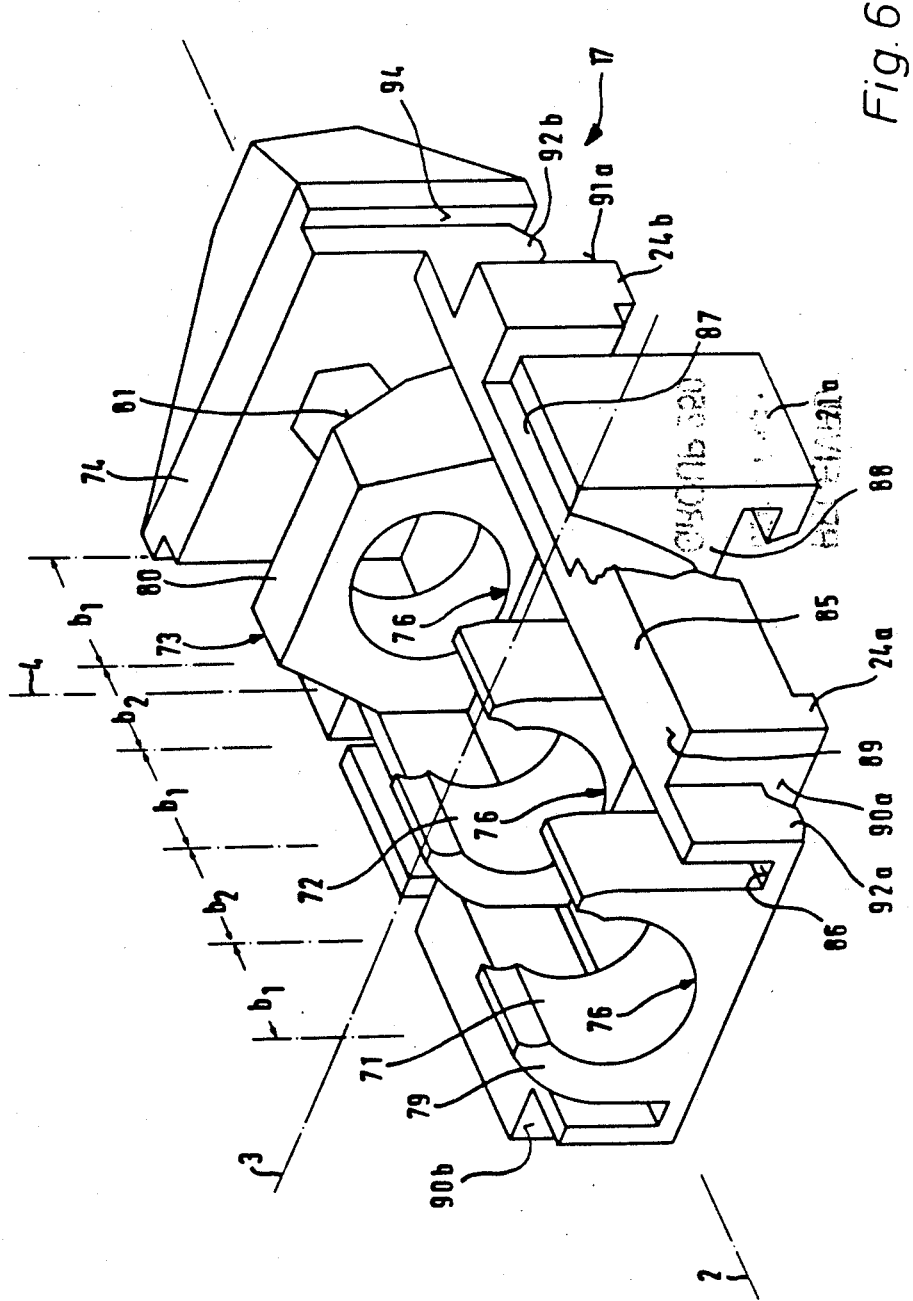
FIG. 6 shows a perspective view of a connecting member in enlarged scale.

FIG. 6 shows a connecting member 17.

The connecting member 17 comprises an approximately freestone-like base body provided at its center in axial direction with a freestone-like recess. As seen from the left facial end in FIG. 6 in direction of the first axis 2, two snapping grippers 71, 72 are disposed, said snapping grippers being spaced apart and disposed one behind the other. The connecting member 17 is further provided with a guide block 73, being spaced apart from the second snapping gripper 72 in direction of the first axis 2, and the connecting member 17 is further provided with an end portion 74, being spaced apart from the guide block 73 along the first axis 2.

The axial dimension and the distance between these elements is chosen in that the snapping grippers 71, 72 have an axial width of $b_1$ and the guide block 73 has an axial width $b_2$. The distance in the clear between snapping grippers 71 and 72 corresponds to the width $b_2$ of the guide block 73. The distances in the clear between the second snapping gripper 72 and guide block 73 as well as between the guide block 73 and end portion 74 are of size $b_1$, corresponding to the width of snapping grippers 71, 72.

On joining the plug connection 1, thereby disposing a second connecting member 17' on the top of the first connecting member 17 in the FIG. 6 position, first snapping gripper 71' engages the space between guide block 73 and end portion 74, second snapping gripper 72' engages the space between second snapping gripper 72 and guide block 73, and guide block 73' engages the space between snapping grippers 71 and 72.

The snapping grippers 71 and 72 are provided with spheric receivings having substantially a same first diameter 76 corresponding to the diameter of the thickwall section 58 of cable sleeve 57. The end portion 74, however, is provided with a stepped bore, said bore at first has an inner contour (inner hexagon) 77, corresponding to the outer contour (outer hexagon) of the second crimp neck 59 of cable sleeve 57, said bore changes into a further cylindrical section with reduced diameter (compare FIG. 7-9) corresponding to the diameter of the not yet reduced first cross section 37 of the light conductor section 11.

For mounting the plug connection 1, the nonepacked light conductor section 11 is inserted through the longitudinal bore of end portion 74 according to the illustration of FIG. 6 from the right side, followed by the step of packing its free end with the lens coupling system 30, as predescribed in connection with FIGS. 4 and 5. The light conductor section 11 is thereafter pulled to the right side of FIG. 6, until it abutes with cable sleeve 57 in a formclosing manner against the axial stop of end portion 74. Within this position the frontial face area 67 is disposed at the right face side of the second snapping gripper 72, as illustrated in FIG. 6, and therefore within the radial plane ¾.

The snapping grippers 71, 72 are provided with a pair of jaws 79 respectively, having inlet inclinations at its free ends. The guide block 73, however, is formed like a sleeve 80, said guide block 73 extends beyond the free ends of jaws 79 in direction of the third axis 3.

The guide block 73 is provided with a wedge surface 81 at its side being directed away from the radial plane ¾. On joining the plug connection 1, the right face area of the first snapping gripper 71 in FIG. 6 slides on said wedge surface 81 as later described in connection with FIG. 7.

The connecting member 17 of FIG. 6 is provided within its freestone-like section with lateral portions 85. For forming the freestone-like recess, longitudinal grooves 86 are provided to divide the snapping grippers 71, 72 from the lateral portions 85. A longitudinal slot 87 is provided at the central area of the lateral portion 85 for forming a film hinge 88 at the bottom of the longitudinal slot 87, thereby allowing a flexible deflecting of snappings hooks 21a, 21a', 21b, 21b'.

Bearing areas 89 are formed at the upper side of lateral portions 85 abuting against corresponding bearing areas 89' of the respective other connecting member 17'. The lateral portions 85 are provided with corners 90a, 90b and 91a, 91b respectively at its facial end.

Edge strips 24a, 24b projecting downwards from the underside of connecting member 17, and being aligned parallel to the second axis 3, can be seen at the underside of connecting member 17. Notches 92a and 92b are formed at the end section of connecting member 17, said section being reduced due to the corners 90a, 90b and 91a, 91b, said notches 92a 92b, are parallel to the edge strips 24a and 24b. The notches 92a, 92b have an approximately trapezoidal cross section.

The end portions 74 are designed substantially like a trunked pyramide. The end portions 74 are provided with a back cut 94 at the base of the trunked pyramide, said base is parallel to the radial plane ¾. Said back cut 94 is parallel to the third axis 4 and is disposed at both sides of end portion 74.

Figure 7:
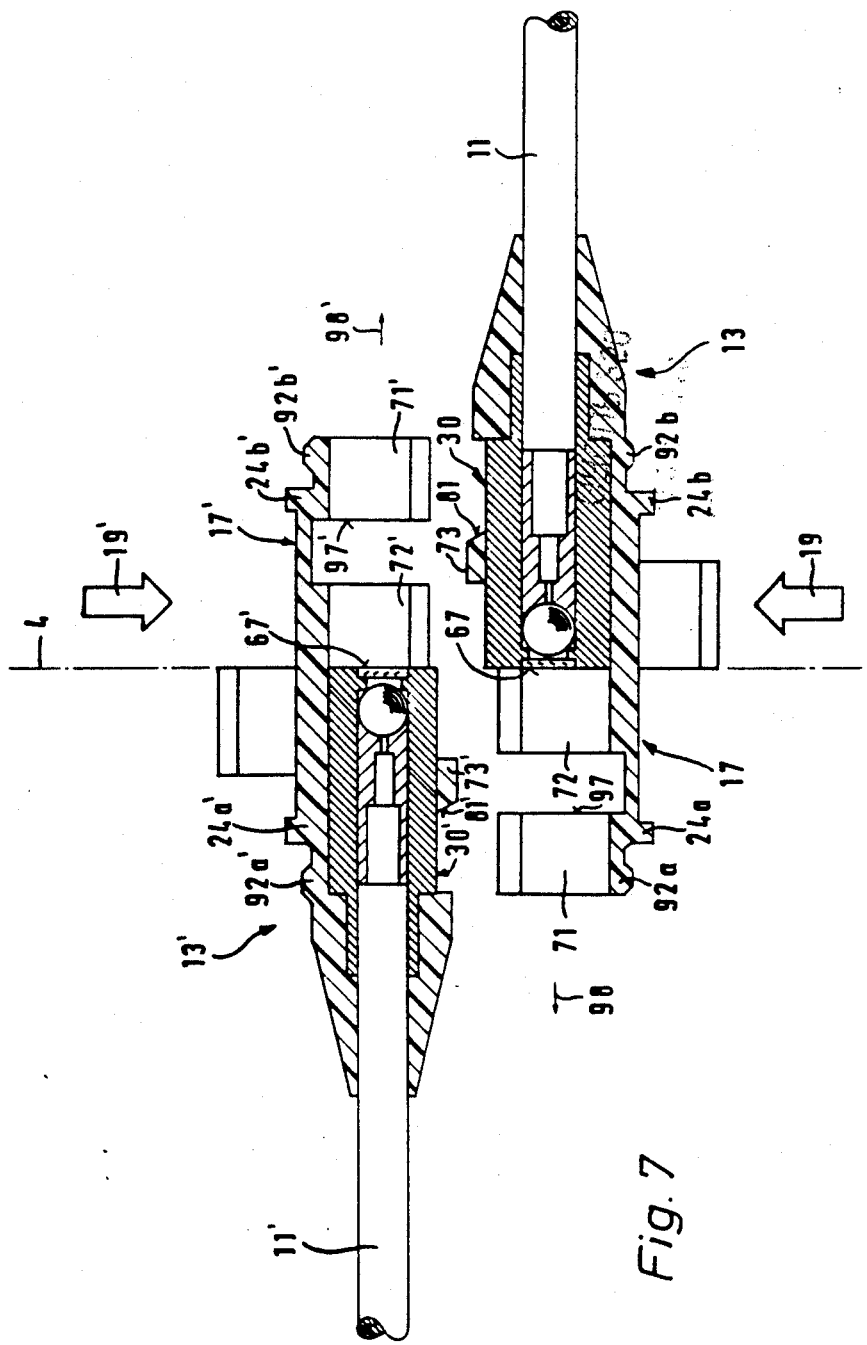
FIG. 7 shows a sectional lateral view of two connecting members containing cable sleeves and light conductors, immediately before joining said connecting member.

FIG. 7 shows the two connecting members 17, 17' in packed condition, having mounted the light conductor sections 11, 11' with the packed fiber end sleeves 37 within the connecting members 17, 17'. The connecting members 17, 17' are disposed in such a position, that the frontial face areas 67 and 67' are in the common radial plane ¾. The plug connection is completed by moving the connecting members 17, 17' in direction of arrows 19, 19' in FIG. 7. Thereby, at first the inner face areas 97 and 97' of the first snapping grippers 71 and 71' run on the wedge surfaces 81 and 81' of the guide blocks 73 and 73' of the respective other connecting member 17. By this way a very small axial component of movement is produced, causing a firmly axial pressing of the lens system couplings 30 and 30' at the frontial face areas 67 and 67' in the joined condition of connecting members 17. Thereby the third O-rings 66 abut one against the other and thereby additionally prevent a penetration of any contamination into a gap between the face areas 67 and 67'.

During engaging the connecting members 17, 17' the cable sleeves 57, 57' at first reach with its cylindrical outer contours of the thickwall section 58 the inlet inclinations and thereafter the engaging area of the jaws 79 of the snapping grippers 71, 71', 72, 72', until the pressure point is overcome and the snapping grippers 71, 71', 72, 72' surround in a flexible and formlocking manner the cable sleeve 57, 57' of the respective other connecting member 17, 17'. Due to an exactly positioning of the spheric receivings of the snapping grippers 71, 71', 72, 72' it is achieved, that the face areas 67, 67' are disposed facing one to another without or only with minimum radial offset.

Even, if after joining the connecting members 17, 17' a minimum radial offset will result, that will not be critical, since the glass balls 51, 51' produce a light beam of relatively great cross section, so eventually expected minimum radial offsets will cause only a very small degree of none-overlapping of these light beams.

After joining the connecting members 17, 17', as described in connection with FIG. 7, locking caps 15, 15' are slided over the assembled ends of the connecting members 17, 17', serving for additional mechanical security.

As can be seen in FIGS. 8 and 9, each locking cap 15 is provided at least in one coordinate direction with a handle mold 100. The locking cap 15 is provided at its inner side with four axial hollow-cavities 101a, 101b, 101c, 101d, and further with a common front cavity 102. The front cavity 102 leads to a rectangular recess as seen from the right side in FIGS. 8 and 9. Flexible counter notches 103a and 103b being perpendicular to the surface of the handle-molds 100 are provided at the edges of the rectangular recess. Further, stops 104a and 104b are provided, being parallel to the handle-molds 100. Said counter notches 103a and 103b, and said stops 104a, 104b respectively extend only about the central area of the edges of the rectangular recess.

In the slided condition of the locking caps 15, as can be seen at the right half of FIGS. 8 and 9, the flexible counter notches 103a and 103b engage the back side of notches 92a and 92a' of connecting members 17, 17' and are additionally checked by the edge strips 24a and 24a'.

The stops 104a and 104b however, lie from the front side only against the corners 90a and 90 b of the connecting members 17 and 17'.

Therefore, the licking caps 15, 15' hold the connecting members 17 and 17' in a direction parallel to the third axis 4 and secure the plug connection 1 against unaimed detaching in direction of arrows 19 and 19' of FIG. 1.

For detaching the locking caps 15, 15', it is only necessary to push laterally against the handle-molds 100 in direction of the second axis 3. Due to the hollow cavities 101a, 101b and the hollow cavity 102, the locking caps 15 and 15' are deformed in such a manner, that the flexible counter notches 103a and 103b curve away from the connecting members 17, 17' and therefore are out of engagement with notches 92a and 92b.

The connecting members 17, 17' and the locking caps 15, 15' are preferably produced as unique pieces of plastic, preferably of polyethersufon (PESU). The components of the lens system coupling 30 however, may be constructed of plastic or metal, as being suitably in the individual case, despite of components as rubber-rings, glass balls and glass windows respectively.

We claim:

1. A light conductor plug connector assembly comprising:
    a first connector body having
        a first longitudinal axis;
        a first light conductor guide section provided with first discrete light conductor guide means arranged on said first axis;
        a first connector section adjoining said first light conductor guide section at a first radial plane;
    a second connector body being identical in shape to said first connector body and having: a second longitudinal axis;
        a second light conductor guide section provided with second discrete light conductor guide means arranged on said second axis;
        a second connector section adjoining said second light conductor guide section at a second radial plane;
    a first conductor having a first front end surface, said first light conductor being inserted into said first light conductor guide section of said first connector body from an axial end opposiet said first connector section, said first front end surface being flush with said first radial plane, said first light condutor being guided through said first discrete light condutor guide means with a first section of said first light conductor protruding therefrom;
    a second light conductor having a second front end surface, said second light conductor being inserted into said second light conductor guide section of said second connector body from an axial end opposite said second connector section, said second front end surface being flush with said second radial plane, said second light conductor being guided through said second discrete light conductor guide means with a second section of said second light conductor protruding therefrom;
    means for snapping said first connector body onto said second connector body in a radial direction with said first radial plane coinciding with said second radial plane including first and second discrete snapping means provided on said first and second connector sections, repsectively, said first and said second discrete light conductor guide means and said first and second discrete snapping means being axially arranged to allow said first discrete snapping means to snap around said second discrete light conductor guide means and said second discrete snapping means to snap around said first light conductor section adjacent said first discrete light conductor guide means.

2. The assembly of claim 1, wherein said first and said second light conductors are contained in sleeves of cylindrical outer shape, said first and said second discrete snapping means being designed as a pair of jaws being open at one side, said pair of jaws having a spheric receiving opening and having inlet inclinations at free terminal ends of said jaws.

3. The assembly of claim 1, wherein said first and said second connector bodies are provided with wedge surfaces, said wedge surfaces causing a force-locking bearing of said wedge surfaces one against the other when said first and second connector bodies are snapped onto each other.

4. The assebly of claim 3, wherein said wedge surfaces are provided on said first and said second discrete light conductor guide means being designed as guide blocks for receiving said light conductors.

5. The assembly of claim 1, wherein said first and said second light conductors are contained in sleeves, said sleeves projecting from said first and said second discrete light conductor guide means on opposite side thereof, said sleeves being snappingly engaged on both said opposite sides by respective discrete snapping means of the respective other connector body.

6. The assembly of claim 1, wherein said first and said second connector bodies are provided with bearing areas, said bearing areas being perpendicular to said radial plane and being aligned across a center point of said first and said second radial planes.

7. The assembly of claim 1, wherein said connector bodies with said discrete light conductor guide means and said discrete snapping means are formed in one single piece of material.

8. The assembly of claim 1, wherein said connector sections are provided with notches at terminal ends thereof, facing away from said radial plane, locking caps being arranged slidable over snapped-together connector bodies, said locking caps being provided with counter notches engaging flexibly said notches of said connector sections.

9. The assembly of claim 8, wherein said locking caps are provided with hollow cavities and wherein a manual compression of said hollow cavities causes a releasing of said counter notches from said notches.

10. The assembly of claim 1, wherein said light conductors are provided at their front end surfaces with a transparent ball, optical fibers of said light conductor adjoining said ball at a side being faced away from said front end surface.

11. The assembly of claim 10, wherein said optical fibers are disposed distant from a surface of said ball.

12. The assembly of claim 11, wherein said optical fibers terminate at a focal point of said ball.

13. The assembly of claim 12, wherein said ball is supported within a ball bed, said ball bed providing said distant arrangement of said optical fibers.

14. The assembly of claim 10, wherein said ball is encased in direction to said front end surface by means of a transparent window.

15. The assembly of claim 10, wherein said ball and said optical fibers are incased within a longitudinal bore of a cable sleeve between two sealings.

16. The assembly of claim 1, wherein said light conductors are crimped within a cable sleeve, said sleeve being guided through said discrete light conductor guide means.

17. The assembly of claim 16, wherein said light conductors have sections of reduced cross-sections and are crimped within said cable sleeve at different cross-section areas.

18. The assembly of claim 17, wherein said light conductors are crimped within a fiber end sleeve at an area of smaller cross-section, thereby forming a polygon cross-section of said fiber end sleeve, and wherein said cable sleeve is slided over said polygon cross-section at an area having a greater cross-section, and said cable sleeve is crimped at said place in such a manner that a second polygon is produced being offset about a half polygon center point angle with respect to said first polygon.

19. The assembly of claim 1, wherein said front end surfaces are provided with an annular sealing.

20. The assembly of claim 1, wherein said first and said second connector bodies are substantially of parallelepiped configuration, when snapped together.

21. The assembly of claim 1, wherein an assembly bar is disposed substantially perpendicular to a snapping-in moving direction of said first and said second connector bodies, and wherein said first and said second connector bodies are mountable by means of supporting means on said assembly bar.

22. The assembly of claim 21, wherein said supporting means are shaped as snapping hooks, said snapping hooks being provided at the connector bodies and being flexibly clippable into recesses of said assembly bar.

23. The assembly of claim 22, wherein said snapping hooks and said connector bodies are formed as one single piece of material.

* * * * *

UNITED STATES PATENT AND TRADEMARK OFFICE
CERTIFICATE OF CORRECTION

PATENT NO. : 4,911,523               Page 1 of 2

DATED : March 27, 1990

INVENTOR(S) : Manfred Sondergeld et al.

It is certified that error appears in the above-identified patent and that said Letters Patent is hereby corrected as shown below:

Column 3, line 2, "connectin" should be --connection--.

Column 5, line 32, "circulferential" should be --circumferential--.

Column 5, line 39, after "shape", insert --,--.

Column 6, line 44, "15'two" should be --15' two--.

Column 6, line 49, after "15'", delete --422-- and insert --as will be described--.

Column 9, line 1, "readial" should be --radial--.

Column 11, line 32, "90 b" should be --90b--.

Column 11, line 35, "licking" should be --locking--.

Column 11, line 62, claim 1, after "conductor", insert --guide means arranged on said first axis;--.

Column 11, line 63, claim 1, delete "guide means arranged on said first axis;".

Column 11, lines 67 - 68 claim 1, after "having:", "a second longitudinal axis" should be a separate paragraph.

Column 12, line 7, claim 1, after "first" (first occurrence), insert --light--.

Column 12, line 10, claim 1, "opposiet" should be --opposite--.

Column 12, line 13, claim 1, "condutor" should be --conductor--.

UNITED STATES PATENT AND TRADEMARK OFFICE
CERTIFICATE OF CORRECTION

PATENT NO. : 4,911,523

DATED : March 27, 1990

INVENTOR(S) : Manfred Sondergeld et al.

It is certified that error appears in the above-identified patent and that said Letters Patent is hereby corrected as shown below:

Column 12, line 14, claim 1, "condutor" should be --conductor--.

Column 12, line 31, claim 1, "repsectively" should be --respectively--.

Column 12, line 53, claim 4, "assebly" should be --assembly--.

Column 12, line 60, claim 5, "side" should be --sides--.

Signed and Sealed this

Twenty-third Day of July, 1991

Attest:

HARRY F. MANBECK, JR.

Attesting Officer

Commissioner of Patents and Trademarks